Nov. 4, 1958            F. P. WILLCOX            2,858,701
SINGLE SHAFT PORTABLE POWER TOOL FOR
ROTATING AND RECIPROCATING MOTIONS
Filed June 29, 1955            3 Sheets-Sheet 1
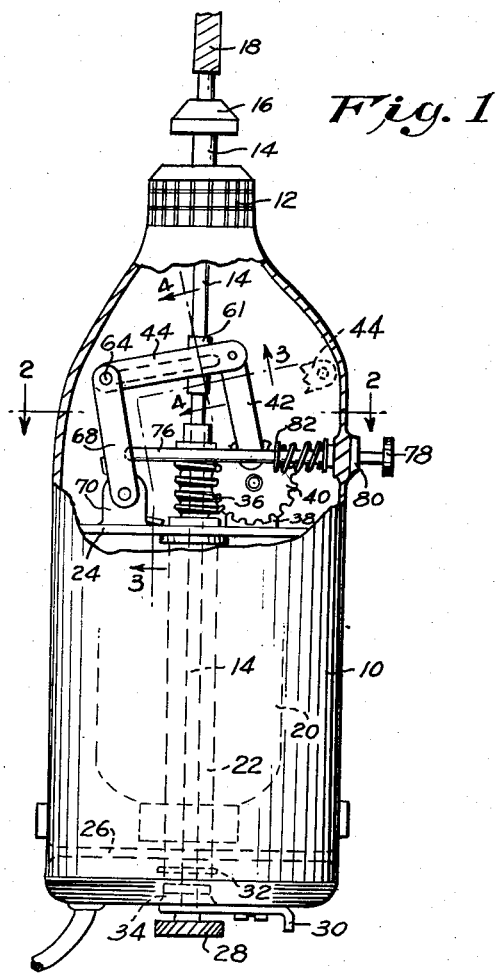
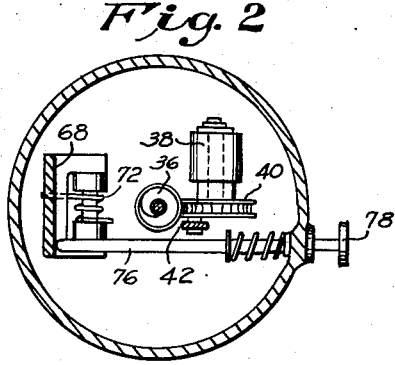
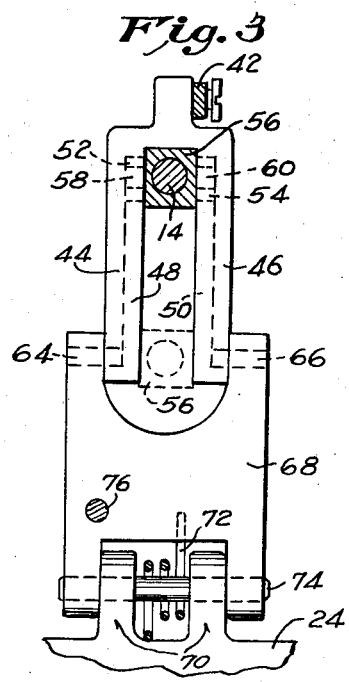
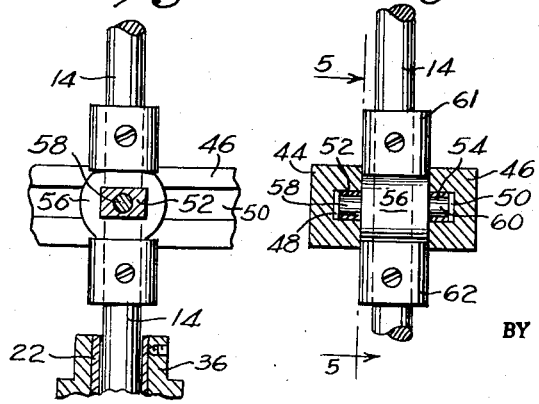
INVENTOR:
F. P. WILLCOX,
BY Homer R. Montague
ATTORNEY

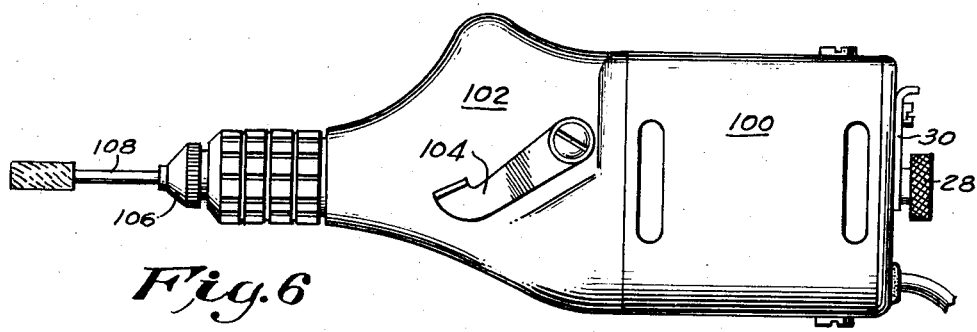
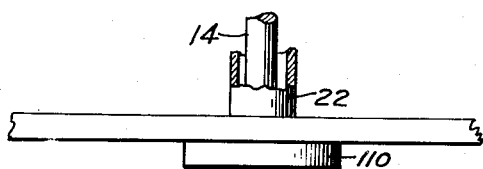
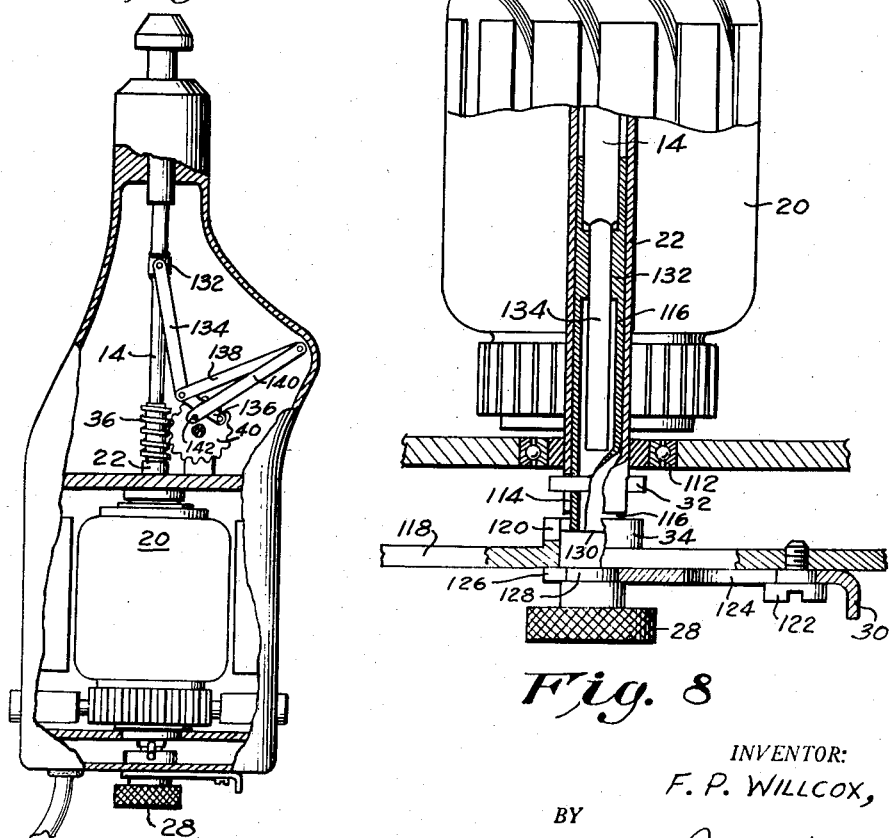

Nov. 4, 1958
F. P. WILLCOX
2,858,701
SINGLE SHAFT PORTABLE POWER TOOL FOR
ROTATING AND RECIPROCATING MOTIONS
Filed June 29, 1955
3 Sheets-Sheet 3

INVENTOR:
F. P. WILLCOX,
BY Homer R. Montague
ATTORNEY

United States Patent Office 2,858,701
Patented Nov. 4, 1958

2,858,701

SINGLE SHAFT PORTABLE POWER TOOL FOR ROTATING AND RECIPROCATING MOTIONS

Frederick P. Willcox, Old Westbury, N. Y.

Application June 29, 1955, Serial No. 518,809

11 Claims. (Cl. 74—22)

This invention pertains to motor driven power tools of the compact and portable type intended to be held in the user's hand for performing drilling, cutting and other shaping operations upon a workpiece. It is a principal object of the invention to provide a tool of this kind in which a single motor drives a single output shaft or the like, but in which the output shaft may be given either rotary or reciprocating motions selectively, or may be given a combination of these motions simultaneously. The invention also provides for selective control of the amplitude of the reciprocating motion, where it is employed, this selection as to amplitude being made instantaneously and without requiring that the tool be stopped. Such a device has wide utility among tool and die makers, model makers, jewelers and home craftsmen.

Motor driven hand tools of this general character have been designed and produced in a variety of forms, including the common portable power drill and a variety of similar devices, such as tools which utilize a very high shaft speed, especially for rotary carving and grinding. It has also been proposed to provide adaptors for converting the normal rotary motion of the output shaft to a reciprocating motion, such as for sawing or filing. However, all of these proposals have required either at least two complete driving units, or a single rotary driving unit with some kind of external or internal transmission to permit the change-over to reciprocating motion.

The present invention aims to provide a high speed tool having a single output shaft or chuck in which can be received either rotary tools such as carving and grinding bits, or reciprocative tools such as files and saw blades, the single chuck permitting simultaneous or selective rotary and reciprocative motion of the tool.

The satisfactory accomplishment of the above and other objects of the invention provides a device of moderate cost which will perform all the functions of a multiplicity of tools of the previously known construction, and will additionally permit operations that cannot be accomplished with known devices of this type.

The manner in which the invention is performed will best be understood by referring now to the following detailed specification of certain preferred embodiments thereof, taken in connection with the accompanying drawings, in which:

Fig. 1 is a view in elevation, with a part of the casing broken away, of a first preferred embodiment of the invention.

Fig. 2 is a horizontal sectional view taken on line 2—2 of Fig. 1.

Fig. 3 is an enlarged fragmentary sectional view taken substantially along the irregular line 3—3 of Fig. 1.

Fig. 4 is another enlarged fragmentary sectional view taken along the line 4—4 of Fig. 1.

Fig. 5 is a sectional view taken on line 5—5 of Fig. 4.

Fig. 6 is a view in elevation of a second embodiment of the invention.

Fig. 7 is a view similar to Fig. 6 but with the casing broken away to show the internal arrangement.

Fig. 8 is a schematic view to a larger scale of parts in the lower half of Fig. 7.

Figure 9:
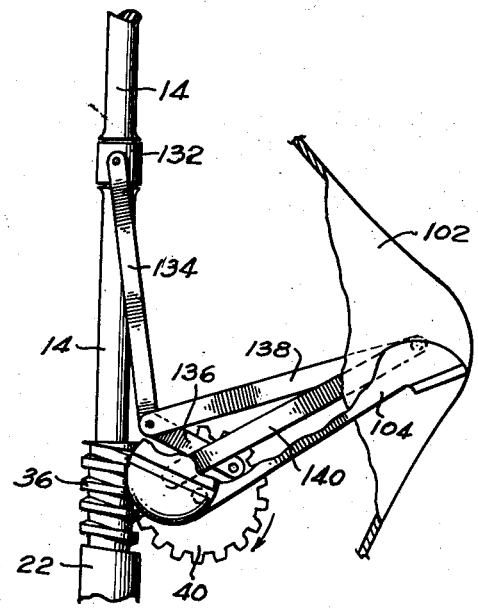
Fig. 9 is a fragmentary view, to the same scale as Fig. 8, showing one position of the linkage controlling the motion of the tool holder.
Figure 10:
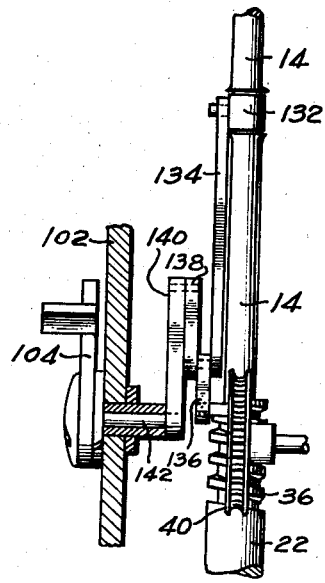
Fig. 10 is a side view of the parts shown in Fig. 9.
Figure 11:
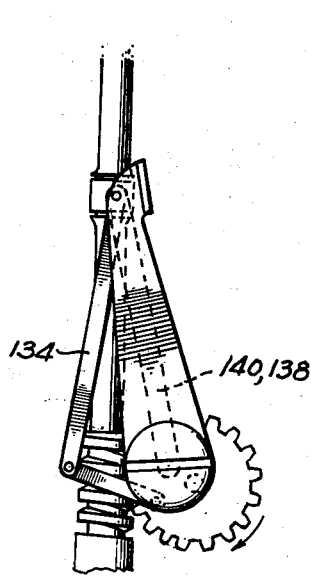
Fig. 11 is a view similar to Fig. 9 but with the parts adjusted for zero amplitude of reciprocating motion.

In general, the invention achieves its objects by providing a motor which will run constantly when the tool is in use, the rotating element or armature of the motor constantly driving a hollow shaft or sleeve which is secured to the armature and journalled in suitable bearings. Provision is made for this hollow sleeve to be coupled and uncoupled from an output shaft which passes entirely through the hollow sleeve and at one end extends outside the casing to carry a tool holder or chuck. By operation of the coupling and uncoupling means, the chuck can be caused to rotate with the motor rotation or locked in a non-rotating condition. To provide the desired reciprocation, the constantly rotating sleeve of the armature carries a worm which produces constant rotation of a worm wheel meshed therewith. Suitable linkage connects this worm wheel with the output shaft, so as to cause its endwise reciprocation whether or not it is also being rotated. Additionally, means are provided for controlling the amplitude of the reciprocation; that is, the "throw" of the linkage connected to the worm wheel. By including in the available range of amplitudes one which corresponds to zero thrust, the reciprocatory motion can be made zero, so that completely independent selective control is achieved of both rotary and reciprocating motions of the chuck.

The invention accomplishes the above aims by simple and compact arrangements to provide a high speed hand tool of great utility and flexiiblity.

Referring now to the first preferred embodiment of the invention, shown in Figs. 1 to 5 of the drawings, the external casing of the tool, indicated by numeral 10, is preferably provided at one end with a knurled portion 12 to assist in a firm grip of the tool when in use. Projecting from this end of the tool is the output shaft 14 carrying a tool holder or chuck 16 which may be of any desired or conventional type, and which receives a suitable tool here shown as a round file 18.

The motor may be of any conventional or desired kind, but is preferably a high speed motor such as the "universal" type which has good speed and power characteristics and will operate from either alternating or direct current. The armature of this motor is indicated in dotted lines at 20, its hollow shaft or sleeve 22 being journalled as in plates 24, 26 mounted inside the casing 10. The commutator and brush holders of this motor are not shown in detail since their construction, and the motor wiring, will be obvious to those familiar with such motors.

At the lower portion of Fig. 1 is indicated a knurled knob 28 which controls the arrangement for connecting the output shaft 14 with the sleeve 22 when rotary motion of the chuck 16 is desired. Knob 28 is pushed in or pulled out to couple and uncouple the shaft 14, its position being fixed by a slide lock 30. When knob 28 is pulled out to uncouple the shaft 14 from sleeve 22, a pin 32 on an intervening part which rotates with shaft 14 is locked in grooves in a fixed boss 34, so that rotary motion of shaft 14 is absolutely prevented.

The detailed construction of parts controlled by knob 28 will be illustrated in connection with a second embodiment of the invention, described below, to which reference is made for a better understanding of this part of the structure.

Sleeve 22 in Fig. 1, which always partakes of the rotation of armature 20, extends upwardly through the bearing plate 24 and has fastened thereto the worm 36 (see also Fig. 5), and output shaft 14 projects through and beyond the worm and through the casing end 12 as described. Bearing plate 24 also has journalled thereon, as by a suitable bracket 38, a worm wheel 40 as also shown in Fig. 2, to which is eccentrically pivoted a link 42 whose opposite end is pivoted to one end of a yoke whose two arms 44, 46 straddle output shaft 14. In fact, as better shown in Figs. 3 and 4, the facing surfaces of these arms are grooved as at 48 and 50 to receive slidingly the rectangular blocks 52, 54. Encircling shaft 14 is a member 56 from opposite sides of which project respective pins 58 and 60 journalled in the respective slide blocks 52 and 54. Collars 61 and 62 are fastened on shaft 14 to engage the upper and under surfaces of member 56, so that as the yoke arms 44 and 46 are raised and lowered, the shaft 14 will likewise move up and down, without interfering with rotation of the shaft if such is taking place. Obviously, collar 61 or 62 could equally well be an integral portion of shaft 14, if desired.

At the opposite end of the yoke from that at which link 42 is pivoted, the two yoke arms are journalled as at 64 and 66 to a generally vertical plate 68 which is pivotally mounted upon bearing plate 24 as by lugs 70. A spring 72 about the bracket pivot pin 74 urges plate 68 in the clockwise direction as seen in Fig. 1, so that yoke 44 will be urged toward a limiting position indicated by dotted lines in Fig. 1. In this position, member 56 will be at the position indicated in dotted lines in Fig. 3, so that its pins 58 and 60 are in alignment with the pivot ends 64 and 66 of plate 68, and rotation of worm wheel 40 will therefore produce zero reciprocation of shaft 14.

In order to produce reciprocation of the shaft 14, and with a controllable amplitude or throw, a push rod 76 projects through the wall of casing 10 and has its inner end engaging plate 68 above the point at which it is carried by brackets 70. The outer end of rod 76 has a thumb button 78, and the rod is urged to the left in Fig. 1 as by a coil spring between its mounting bushing 80 and a washer 82 secured to the rod itself. This spring is only of sufficient strength to maintain the rod 76 tight against plate 68, while spring 72 easily overcomes this force so that the parts are in the zero stroke position until button 78 is manually depressed. When the button is so depressed, plate 68 moves counter-clockwise, for example, to the maximum-stroke position of Fig. 1, and arms 44, 46 slide along blocks 52 and 54 to a point where rotation of these arms via worm wheel 40 produces maximum reciprocation of shaft 14 as worm 36 rotates. The stroke can readily be regulated by the pressure applied to button 78.

It will be seen that with the above arrangements, shaft 14 can be made idle while the motor is operating, or it can be caused either to rotate or reciprocate, or both, at the will be of the operator. Since, at zero stroke, the member 56 is aligned with the pivot axis 64, 66, and chuck 16 is locked against axial motion, very light tool action can be nicely controlled either with the motor energized or stationary.

Figs. 6 to 12 inclusive illustrate a modified form of the arrangement for controllable reciprocation of the tool shaft, and show in more detail the identical shaft-rotation controlling parts already described briefly in connection with the first embodiment. In Fig. 6, the motor casing is indicated at 100, usual ventilating slots and brush holder caps being indicated. A forward part of the casing, numbered 102, is shaped to cover the parts within, and carries a control lever 104 by which the degree of reciprocation can be controlled in a manner to be described. The tool shaft is shown as terminating in a tool holder or chuck 106, carrying a tool 108. At the opposite (right-hand) end of casing 10, the rotation-control knob 28 and slide 30 are shown, these parts being identical with the corresponding parts of Fig. 1.

The internal arrangement is indicated in the broken-away view of Fig. 7, in which numeral 20 again designates the motor armature and 22 the sleeve on which it is secured, carrying worm 36, and worm wheel 40. The rotation-controll mechanism will be understood by referring now to Fig. 8, which shows these parts broken away and on a larger scale for clarity. The hollow shaft 22 which is connected for turning with the rotor 20 itself is carried in the bearings 110 and 112. It extends through lower bearing 112 in Fig. 8 for a short distance, and at its lower end has one or more open slots 114 extending parallel to the axis of rotation and adapted to be entered by the cross pin 32 fixed within the transverse to cylindrical control sleeve 116 fitted within the hollow shaft 22. The bottom cover or end plate 118 has a boss 34 coaxial with the motor axis, and this boss has its walls also slotted as at 120 so that when the control sleeve 116 is pulled downwardly from its Fig. 8 position, the cross pin 32 therein leaves the slots 114 in the hollow shaft 22 and enters slots 120 in the boss, to lock the control sleeve against rotational movement. The axial position of sleeve 116 is controlled by the knob or button 28, whose shank is integral with or secured to the end of the control sleeve.

Locking slide 30 is held on the end wall 118 as by a shouldered screw 122 whose shoulder lies within a slot 124 in the slide, and at its left end the slide is slotted as at 126 to engage within an annular groove 128 of the shank of knob 28 when the knob is in the position shown. When the slide 30 is moved to the right, knob 28 may be pulled out, and slide 30 returned to lock behind a shoulder 130 of the knob shank. In the latter position, pin 32 prevents any rotation of the control sleeve 116.

An intermediate portion 132 of sleeve 116 is formed with a bore of square or other non-circular internal cross-section, and this portion of the bore slidably engages a correspondingly shaped end 134 of tool shaft 14, which shaft extends upwardly through the hollow motor shaft 22 and is connected to or integral with the shaft passing out the forward end of the device (Fig. 7) and which carries the tool holder 106.

From the above, it will be seen that whenever the motor is energized, the hollow shaft 22 is rotated, and if the pin 32 is in its upper position (as shown) this rotation will be conveyed to the control sleeve 116, and via its square portion 132 to the shaft 14, rotating the tool holder 106 at the same speed as the rotor 20. If knob 28 and its shank are integral with the control sleeve 116, the knob will also rotate, but this can readily be prevented, if desired, by providing a loose connection between the knob or its shank and the sleeve 116.

When knob 28 is pulled out to its second position, pin 32 leaves slots 114 and engages slots 120 in boss 34, thus locking sleeve 116 and shaft 14 against rotation, although the rotor 20 is free to continue to rotate. Also, due to the slidable connection between non-circular parts 132 and 134 of the sleeve and shaft, the shaft 14 remains free to reciprocate lengthwise. The drive for this reciprocating motion will now be described.

After passing through bearing 110 (Figure 8), the hollow rotor shaft 22 again terminates in a worm 36 which engages with a worm wheel 40 suitably mounted for rotation in the casing, as in Figs. 1 to 6. This wheel therefore rotates whenever the rotor 20 turns, although at a reduced speed and with increased torque. The upper extension of shaft 14, to which the tool holder is connected, is provided with a loose collar indicated at 132, which fits between shouldered portions of shaft 14. Thus, shaft 14 may be reciprocated lengthwise by imparting reciprocatory motion to the collar 132, and without interfering with rotation of shaft 14. To provide this reciprocatory motion of collar 132 and shaft 14, a link 134 is pivoted to the collar and is in turn pivoted to a short link 136 pivotally connected to an eccentric point on wheel 40. A link 138 connects the point of connection between 134 and 136 to the outer end of a control lever 140 whose inner end is pivoted as on a fixed shaft 142 passing through the wall of casing part 102 (see Figs. 9 and 10) and to which is secured one end of the control lever 104. These parts are arranged so that control levers 104 and 140 rotate together, and friction is provided against the casing wall so that they will remain in the positions selected by the operator when manipulating lever 104.

Rotation of control lever 104 thus rotates lever 140 about shaft 142 and in effect determines the position of its outward end. In the position of parts shown in Fig. 9, rotation of wheel 40 provides a maximum stroke or throw to the shaft 14. When the control lever 104 is shifted to the Fig. 11 position, wherein link 140 overlies link 138, rotation of wheel 40 produces zero stroke. Intermedate positions provide a continuous range of stroke amplitudes, and in any position, of course, the shaft 14 may be rotated or not as determined by knob 28.

Figure 12:
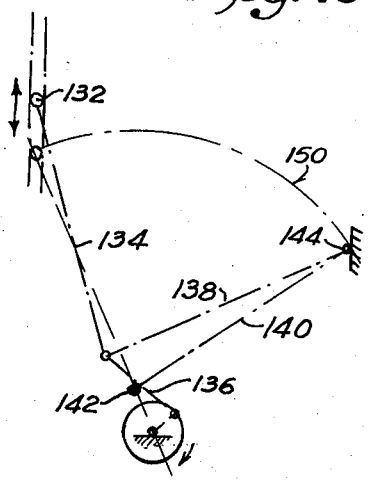
Fig. 12 is a schematic diagram clarifying the relationship and operation of the linkage of Figs. 9 to 11.

Fig. 12 is a schematic diagram of the geometrical relationships of the links and levers, indicating the necessary relationships therebetween to provide the action already described. Point 144 may be thought of as fixed for any setting of the control lever 104. In the Fig. 12 position, links 136 and 134 impart maximum stroke to shaft 14. When point 144 is swung along arc 150 (whose center is shaft 142) until point 144 overlies the pivotal connection of link 134 to shaft collar 132, then zero stroke amplitude results. Links 138 and 140 are of the same length, and with shaft 14 fully retracted, point 132 must lie on the extension of a line connecting the axis 142 and the axis of wheel 40.

While the linkage system has been illustrated in one suitable form, it will be understood that numerous refinements will suggest themselves to those familiar with mechanisms. Thus, the connection between shaft 14 and its driving linkage may be arranged on opposite sides of the shaft to balance the torques thereon. Also, the adjustment of the position of the end of lever 138 could be accomplished by a pin at its end riding in an arcuate slot in the casing wall rather than by the lever 104. The essential features are the provision for a rapid selection of the desired stroke length, including a zero stroke position, without interference with the rotation of the shaft 14.

The constructions outlined above have many advantageous features for filing, cutting, drilling and like operations on both large and small parts, and the coaxial arrangement of the instrument and the use of a single shaft susceptible of both rotation and reciprocation is highly efficient and a great convenience.

What is claimed is:

1. A portable tool comprising a housing, a motor mounted within said housing, a first shaft coaxial with said motor and rotatably driven thereby, a second shaft coaxial with said first shaft and extending through said housing, a tool chuck mounted on said second shaft outside said housing, means selectively operable to lock together said shafts for concurrent rotation, and means driven by said first shaft and operable independently of the condition of said first named means to reciprocate said second shaft.

2. A portable tool in accordance with claim 1, in which said first shaft is hollow, and in which said second shaft is mounted for axial reciprocation within said first shaft.

3. A portable tool in accordance with claim 2, in which said selectively operable means includes a sleeve slidably journalled within said first shaft, a portion of said second shaft being slidably keyed to said sleeve, a clutch connection between said first shaft and said sleeve, and manual means for sliding said sleeve within said first shaft to control the engagement of said clutch connection.

4. A portable tool comprising a housing, a motor mounted within said housing, a first shaft coaxial with said motor and rotatably driven thereby, a second shaft coaxial with said first shaft and extending outside said housing, a tool chuck mounted on said second shaft outside said housing, manually operable means to lock together said shafts for concurrent rotation, and means operable independently of said first-named means to impart reciprocal translation to said second shaft, the last-named means comprising a worm gear mounted on said first shaft, a worm wheel driven thereby, and a mechanical linkage connected between said worm wheel and said second shaft.

5. A portable tool comprising a housing, a motor mounted within said housing, a first shaft coaxial with said motor and rotatably driven thereby, a second shaft coaxial with said first shaft and extending outside said housing, a tool chuck mounted on said second shaft outside said housing, means selectively operable to lock together said shafts for concurrent rotation, and means operable independently of said first-named means to impart reciprocal translation of variable amplitude to said second shaft, the last-named means comprising a worm gear mounted on said first shaft, a worm wheel driven thereby, and an adjustable mechanical linkage connected between said worm wheel and said second shaft.

6. The invention in accordance with claim 5, wherein said first and second-named means each includes a manually operable control element extending through a wall of said housing.

7. A portable motor-driven device for driving a tool selectively in rotational and reciprocating movements comprising a housing, a motor in said housing, a power output shaft carried by said housing for rotation and axial reciprocation, manually operable means for selectively connecting said output shaft to said motor for rotating said shaft, and a linkage permanently connecting said shaft to said motor for reciprocating said output shaft, said linkage including a manually adjustable element for adjusting said linkage to regulate the stroke of said shaft during reciprocation.

8. A device in accordance with claim 7, including means biassing said element to a position of zero stroke.

9. A portable motor-driven device for driving a tool selectively in rotational and reciprocating movements, comprising a housing, a motor in said housing, a power output shaft carried by said housing for rotation and axial reciprocation, a linkage permanently connecting said shaft to said motor for reciprocating said output shaft, and manually operable means for selectively connecting said output shaft to said motor for rotating said shaft, said manually operable means being movable between two positions in one of which it connects said output shaft to said motor, and in the other of which it restrains said output shaft against rotation.

10. A device in accordance with claim 9, including means for selectively locking said manually operable means in either of its respective positions.

11. A portable motor-driven device for driving a tool selectively in rotational and reciprocating movements, and simultaneously in both movements, comprising a housing, a motor in said housing, a power output shaft carried by said housing for rotation and axial reciprocation, manually operable means operable between a first position in which it connects said output shaft to said motor for rotating said output shaft and a second position in which it disconnects the shaft from the motor and locks said shaft against rotation, and an adjustable linkage permanently connecting said shaft to said motor for reciprocating said output shaft at any one of a continuous range of reciprocative amplitudes, including zero amplitude.

References Cited in the file of this patent

UNITED STATES PATENTS

| | | |
|---|---|---|
| 812,626 | Wilson | Feb. 13, 1906 |
| 2,436,493 | Shepard | Feb. 24, 1948 |
| 2,477,755 | Langfelder | Aug. 2, 1949 |
| 2,485,159 | Malarkey | Oct. 18, 1949 |
| 2,531,849 | Karleen | Nov. 28, 1950 |
| 2,601,788 | Parker | July 1, 1952 |